March 31, 1942.  F. W. DUNMORE  2,277,692
MEASURING CLOUD HEIGHT AND THICKNESS
Filed May 4, 1938  2 Sheets-Sheet 1

Francis W. Dunmore,
INVENTOR

BY
ATTORNEY

March 31, 1942.  F. W. DUNMORE  2,277,692
MEASURING CLOUD HEIGHT AND THICKNESS
Filed May 4, 1938  2 Sheets-Sheet 2

Light Brightness.

Light brightness
Feet Altitude.

Francis W. Dunmore,
INVENTOR

BY *J. T. Motherhead*
ATTORNEY

Patented Mar. 31, 1942

2,277,692

UNITED STATES PATENT OFFICE 2,277,692

MEASURING CLOUD HEIGHT AND THICKNESS

Francis W. Dunmore, Washington, D. C., assignor to the Government of the United States of America, as represented by the Secretary of Commerce and his successors Application May 4, 1938, Serial No. 206,087

20 Claims. (Cl. 250—2)

(Granted under the act of March 3, 1883, as amended April 30, 1928; 370 O. G. 757)

This invention relates to the use of radio on a free balloon, for sending signals which are a function of light intensity which signals may be interpreted in terms of cloud height and thickness.

With the expansion in air navigation, information giving cloud height and thickness becomes of increasing importance.

Heretofore, by sighting on a free balloon the ceiling (height to the bottom of clouds) only could be determined in clear weather. Cloud thickness nor the number of cloud layers could not be determined.

The object of my invention is therefore to furnish information at ground points in any type of weather, of the thickness of cloud layers (even if extending to the ground) the height to the top and bottom of each and the number of layers. In many instances a knowledge of the thickness of a cloud layer would determine whether or not a pilot should climb through it or remain under or in it. Also in cases of no ceiling, i. e., clouds extending down to the ground, the determination of the height to the top of this cloud layer would determine whether or not a pilot could take off and easily climb above it.

Briefly the equipment for giving this information consists of a free balloon carrying a small battery-operated ultra-high radio-frequency transmitter with a special form of relaxation type of oscillation modulator. A photo-tube, or a plurality of phototubes, switched into the relaxation oscillator circuit changes the relaxation oscillator frequency depending upon the amount of light present (cloud structure). The ultra-high radio-frequency carrier wave is therefore modulated at a frequency which is a function of light brightness. An ultra-high radio-frequency receiver is used on the ground with a graphical frequency recorder calibrated in terms of light brightness. Height is determined from the known rate of ascent of the balloon or by switching in alternately with the photo-tube any one of the present type of radio meteorograph altitude indicators such as the pressure-operated commutator, the Oland clock type etc. Since light brightness is a function of cloud conditions the graph of light brightness may be interpreted in terms of cloud heights and thicknesses. In one form of my invention the window of the photo-tube is faced downward while in another form two photo-tubes are switched into circuit, one facing up and the other down.

Other and further objects of my invention will be apparent from the following detailed description and the accompanying drawings. It is to be expressly understood, however, that these drawings are for purposes of illustration only and are not designed for a definition of the limits of my invention. Referring to the illustrations:

Figure 6:
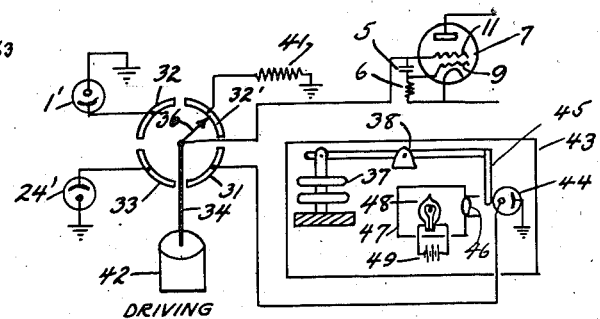
Figure 7:
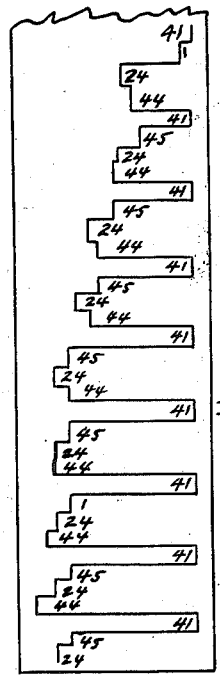
Figure 8:
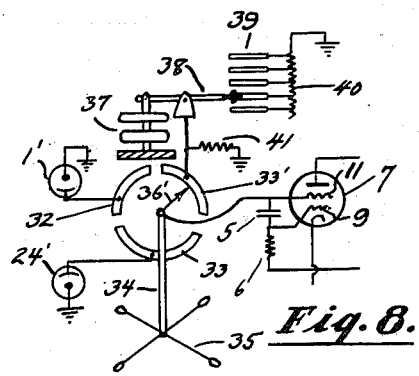
Figure 9:
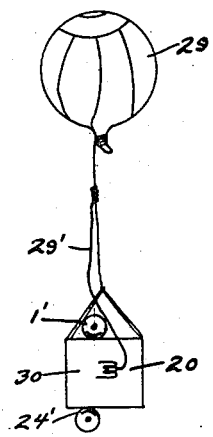
Figure 10:
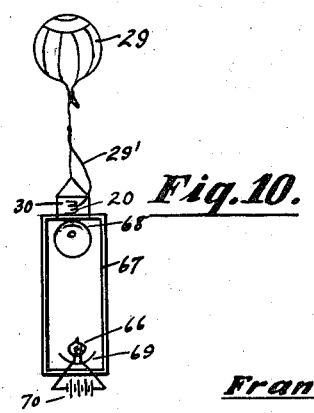

Fig. 6 diagrammatically illustrates a modified arrangement for sending a signal which is a function, sequentially, of several factors shown as light brightness from below, light brightness from above, a reference value, and altitude;

Fig. 7 shows a record typical of the circuit of Fig. 6;

Fig. 8 shows a modification of Fig. 6 employing a different altitude responsive device incorporating the reference value provision;

Fig. 9 shows a mode of locating the two photocells of Figs. 6 and 8 on the top and bottom of the transmitter housing, and Fig. 10 illustrates a modified form of apparatus employing an artificial light source for night observation.

Figure 1:
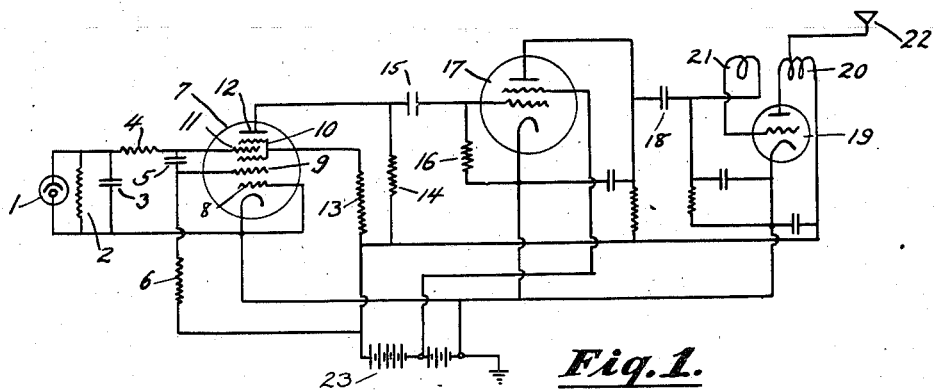
Fig. 1 is one form of transmitter circuit arrangement for sending a signal which is a function of light brightness; in which 3 tubes are used.

Referring to the drawings more in detail, Fig. 1 shows one circuit arrangement of the transmitter carried aloft by the balloon in which 1 is a standard type of photoelectric tube sensitive to the visible and ultra-violet spectrum, 7 is an electron tube preferably of the 1—A—6 with No. 1 grid shown at 8, No. 2 grid at 9, No. 3 and 5 grids at 10 and No. 4 grid at 11. The phototube 1 is connected across grid 11 and filament of tube 7 in series with resistor 4, which resistor fixes the upper limit of oscillation of tube 7, while resistor 2 in shunt with photo-cell 7 fixes the lower limit of oscillation of tube 7. In this way the frequency band produced by the variation of light on photo cell 7 is kept within the limits of the recording apparatus on the ground. Coupling condenser 5 between grid 11 and 9 together with resistor 6 connecting grid 9 to the 90-volt tap of battery 23, determine the range of frequency of oscillation of tube 7 when subject to the variation in resistance of photo-cell 1. Grids 9 and 10 are supplied with the correct potential from battery 23 through resistors 6 and 13 and the plate 12 is energized from 23 through resistor 14.

The output of tube 7 from plate 12 passes through coupling condenser 15 to the conventional type of audio amplifier tube and circuit 17 and thence through coupling condenser 18 to the conventional form of high-frequency oscillator 19 with associated antenna 22. The operation of this circuit is such that any variation of light brightness (cloud structure) on cell 1 causes its resistance to change. The circuit arrangement of tube 7 is such that any variation in resistance of the input circuit of grid 11 causes a change in the audio oscillation frequency produced by this tube, so that the audio frequency produced by tube 7 is a function of the light brightness falling on cell 1. The output of tube 7 is coupled through condenser 15 to amplifier tube 17. This tube in turn serves to modulate the radio-frequency oscillator comprised of tube 19 and inductor 20 and 21. The carrier wave radiated from antenna 22 (on the balloon) is therefore modulated at a frequency which is a function of the light brightness falling on cell 1.

Figure 3:
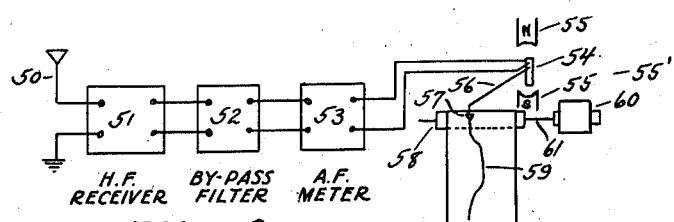
Fig. 3 shows an arrangement of receiving and recording apparatus.

This signal is received on the ground by means of a suitable circuit arrangement shown in Fig. 3. In this circuit 50 is a conventional antenna which may be of the directive or non-directive type. 51 is a conventional high-frequency receiver which is tuned to the carrier frequency transmitted from the balloon. The output of the receiver 51 is passed through a band-pass filter which serves to exclude all audio frequencies outside the band of audio frequencies transmitted by the apparatus on the balloon. The output of band-pass filter 52 is connected to a direct-reading frequency meter which may be of the General Radio type 834-B. This type of meter gives a current output which is a direct function of the frequency input. The output of 53 may therefore be connected to a graphical recording milliammeter 55'. This milliammeter consists of magnets 55 and moving coil 54 which carries arm 56. Arm 56 carries recorder pen 57. This pen bears on paper 59 which is moved under it by means of motor 60 operating shaft 61 which in turn is attached to the paper roll. Motor 60 should preferably be of the synchronous time-keeping type so that the graphical record 59 will be coordinated with time. The graph produced by pen 57 is therefore proportional to the frequency applied to the input of frequency meter 53, which frequency in turn is a function of the light brightness falling upon the photo cell carried by the balloon.

Figure 2:
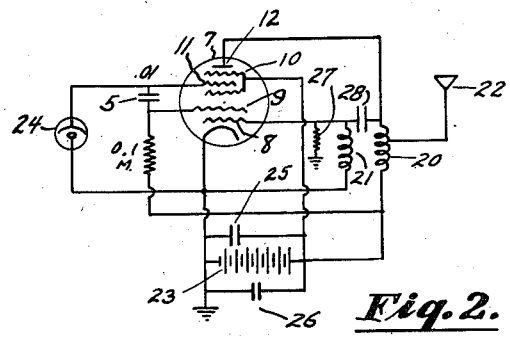
Fig. 2 is a modification of the arrangement shown in Fig. 1 in which but one tube is employed.

In Fig. 2 is shown a circuit arrangement in which one tube performs the dual function of audio oscillator and radio-frequency oscillator. In this circuit 8 is the oscillator grid, 9 is the anode grid, 10 is the screen grid, and 11 is the control grid. The audio-oscillator portion of the circuit operates on the negative characteristic produced between grid 9 and 11. The audio-frequency determining circuit consists primarily of condenser 5 and the total resistance of the control grid circuit, which consists in part of photo cell 24 which faces downward as the balloon ascends.

The radio-frequency oscillator portion of the circuit consists of oscillator grid 8, plate 12, inductors 20 and 21, condenser 28, and resistor 27. The audio-frequency generated in the other part of the tube circuit is impressed on the radio-frequency oscillations by means of electron coupling.

Figure 4:
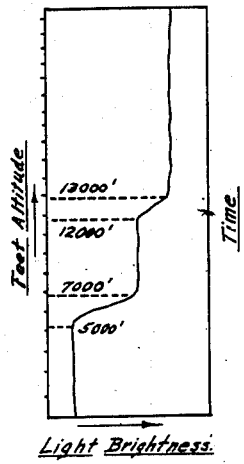
Fig. 4 shows a typical form of record obtained when two cloud layers are present, one at 5000 to 7000 ft. and the other at 12,000 to 13,000 ft.
Figure 5:
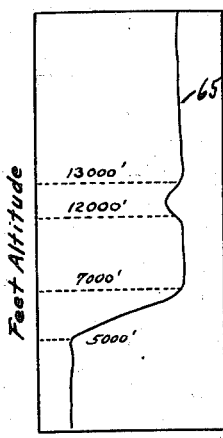
Fig. 5 shows a typical record obtained when a lower cloud layer is present at 5000 to 7000 feet and a scattered cloud layer exists above it at 12,000 to 13,000 ft.

A typical graph of light brightness as might be obtained on the receiving setup of Fig. 3 when receiving signals from the transmitters shown in Figs. 1 and 2 is shown in Fig. 4. Here the ordinate designates time and altitude, the altitude being obtained by knowing the rate of ascent of the balloon. It has been found that balloons ascend at approximately a fixed rate. The abscissa designates the pitch of the received signal or light brightness. It will be noted that the light brightness remains substantially constant up to 5000 ft., the bottom of an extensive cloud layer. This is to be expected as it is an indication of the amount of light that has penetrated the cloud layer above. From 5000 to 7000 feet the light brightness increases rapidly, this major gradient of light intensity change indicating that the balloon was penetrating the light absorbing medium (the cloud). From 7000 to 12,000 feet the light brightness remained steady, equivalent to that reflected from the top of the cloud layer below, indicating a clear space, but it increases again from 12,000 to 13,000 feet, indicating a second cloud layer. Above 13,000 no further cloud layers are observed as the light brightness remains constant. This chart indicates two extensive cloud layers. Had the second cloud layer consisted of scattered clouds, the record of major gradients of light intensity change would have been similar to that in Fig. 5. Since a greater amount of light is reflected up to the photo-cell when above the first cloud layer due to the sun hitting the top of it through the scattered clouds, the light brightness will be greater above the first cloud layer and will decrease as the balloon enters a scattered cloud at 12,000 feet, then it will increase again as it emerges. This initial decrease is caused by strong illumination on the top and bottom of the scattered cloud.

In Fig. 6 is shown an arrangement of two photo-cells 1' facing up and 24' facing down and each being connected to a commutator 32 and 33 respectively. Commutator segment 32' is connected to ground through calibrating resistor 41. Segment 31 is connected to a photo-cell 44 the resistance of which is a function of altitude. This is possible by means of light 48 supplied by battery 49. 48 is in housing 47 and illuminates photo-cell 44 through lens 46. Shutter 45 in front of lens 46 is operated by pressure actuated unit 37 so that it adjusts the amount of light falling on cell 44 depending upon the atmospheric pressure. The arm 36 is revolved over segments 32, 32', 33 and 31 by means of driving mechanism 42 which may be of the spring, electric or wind-driven type. Arm 36 is connected to the control grid 11, No. 4 grid of relaxation oscillator tube 7. The rest of the circuit associated with tube 7 is the same as in Fig. 1. As the arm 36 rotates audio notes are sent which are a function of light brightness from below, light brightness from above, the value of resistor 41 which is constant and serves as a calibration check, and a note which is a function of altitude.

A typical record as might be obtained with the circuit in Fig. 6 is shown in Fig. 7. Here 44 represents the frequencies obtained when switch arm 36 contacts commutator 31 giving the altitude, 24 represents the frequency obtained when switch arm 36 contacts commutator 33 giving light brightness below, 45 represents the frequency obtained when arm 36 contacts segment 32, giving light brightness above. 41 represents the frequency obtained where arm 36 contacts segments 32' a frequency is sent which indicates calibration.

A modification of the circuit shown in Fig. 6 is shown in Fig. 8. In Fig. 8 commutators 31 and 32' are combined into 33'. The circuit arrangements and apparatus on commutators 32 and 33 and arm 36 remain the same as in Fig. 6. Commutator 33' is connected to resistor 41 serving the same function as in Fig. 6. It is also connected to an arm 38 operated by air pressure device 37. Arm 38 moves over commutator 39 each segment of which is connected through a different value of resistor 40 which is grounded at one end. Thus depending on the segment of commutator arm 38 is touching a note is sent (when arm 36 touches segment 33') which is a function of altitude. If arm 38 is between a segment a note is sent which is a function of resistor 41 (calibration check).

In Fig. 9 is shown the arrangement of balloon 29, antenna 29', housing box 30, transmitter 20 and associated photo-cell 1' facing up and cell 24' facing down.

In Fig. 10 is shown a modification of my invention whereby cloud structure may be measured at night. This is done by locating a light 66 in such association with the light sensitive element 68 that cloud structures may influence the transmission of light from the source to the element. Preferably the light will be hung below the light sensitive element 68, or vice versa, and the light if desired may be provided with a suitable reflector. If a parallel beam, or light focusing reflector is used, as shown at 69, the support 67 carrying the reflector and light source will preferably take the form of a rigid arm to avoid change of light intensity other than that due to cloud structure. The support 67 may conveniently be positioned some 10 or 20 feet below the transmitter housing 30 supported by balloon 29, and the light may be battery operated as indicated at 70. As long as no cloud intervenes between light 66 and cell 68 the received audio note will remain constant. When in a cloud, however, the note will change in proportion to the cloud density. If desired the position of cell 68, and light 66 with reflector 69 and battery 70 may be reversed. The graph obtained with such arrangement, by receiving and recording in the manner exemplified in Fig. 3, bears a strong resemblance to that exemplified in the upper part of Fig. 5. The light received by cell 68 from lamp 66 remains substantially constant except when these elements are traversing a cloud. At that time however, the light passing from 66 to 68 is reduced in a manner related to the cloud density, i. e., to the spacial density of condensed moisture particles, so that the functionally related signal, when plotted, indicates a decrease and increase of light intensity corresponding to the increase and decrease of cloud density as the cloud is traversed.

The foregoing description comprehends only a general and preferred embodiment of my invention and changes in my method and details of my apparatus may be made within the scope of those claims which may be allowed, and therefore these claims are not intended as restricted to the specific details of my invention as disclosed herein.

The invention herein described may be manufactured and used by or for the Government of the United States without the payment to me of any royalty thereon.

What I claim is:

1. A system of the type employing a balloon-carried radio transmitter and means for receiving and recording the signals emanated at different known altitudes by said transmitter; particularly characterized in that said radio transmitter includes a modulation generator and a photo-electric cell having its sensitive area oriented downwardly and connected to control the modulation of said modulation generator as a function of the amount of light falling on the photo-electric cell from the underlying regions previously traversed by the balloon in flight, whereby recording of said modulation characteristic produces a charted indication of cloud height and thickness substantially as described.

2. A system of the type employing a radio transmitter carried by an air-borne-carrier and means for receiving and recording the signals emanated at different known altitudes by said transmitter; particularly characterized in that said radio transmitter includes a modulation generator and a photo-electric cell connected to control the modulation characteristic of said modulation generator as a function of the amount of light reaching said photo-electric cell, and in that said air-borne-carrier further carries a light positioned remotely with respect to said cell and directed on said cell, whereby recording of the modulation characteristic generated in a night-flight of said air-borne-carrier produces a charted indication of cloud height and thickness, substantially as described.

3. In a system of cloud height determination, in combination, a transmitter comprising a relaxation oscillator the oscillation frequency of which is controlled by two resistors, switching means for serially separately connecting said resistors in frequency controlling relation to said oscillator, one of said resistors being in the nature of a light sensitive photo-electric cell, the other of said resistors being variable in response to barometric pressure, a radio-frequency ocsillator modulated by said relaxation oscillator, means for radiating the modulated radio-frequency energy of said radio-frequency oscillator; a receiving base and means thereat receiving energy from said radiating means, and including graphical frequency recording means responsive to said modulation frequency.

4. In a system of cloud height determination, in combination, a transmitter comprising a relaxation oscillator the oscillation frequency of which is controlled by two resistance circuits, switching means for serially separately connecting said resistance circuits in frequency controlling relation to said oscillator, one of said resistance circuits comprising a light sensitive photo-electric cell, the other of said resistance circuits comprising a barometric pressure control commutator varied resistance, a radio-frequency oscillator modulated by said relaxation oscillator, means for radiating the modulated radio-frequency energy of said radio-frequency oscillator; a receiving base and means thereat receiving energy from said radiating means, and including graphical frequency recording means responsive to said modulation frequency.

5. The combination of claim 4, said commutator comprising insulating and conductive segments and said other resistance circuit comprising a fixed resistance in parallel with said commutator and the resistance varied by it.

6. A system of cloud height determination comprising, on an object with varying altitude, a relaxation oscillator the frequency of oscillation of which is controlled by three photo-cells, two of said cells being exposed to the sun's light arriving from different directions and the third to light from a source whose intensity is a function of the altitude of said object with varying altitude, switching means for serially connecting each of the photo-cells separately to control the relaxation oscillator, a radio-frequency oscillator modulated by said relaxation oscillator, means for radiating the modulated radio-frequency energy of said radio-frequency oscillator; a receiving base and receiving means thereat for receiving energy from said radiating means, graphical frequency recording means associated with said receiving means, said recording means being responsive to the frequencies of said relaxation oscillator; whereby the graphical record produced by said graphical recording means is a constant measure of the height of the cloud structure surrounding said object with varying altitude.

7. In a system for determining altitude and vertical thickness of clouds at night, in combination, an ambulant carrier ascending at a known rate, a radio transmitter including a modulation generator carried by said carrier, a light sensitive cell controlling the modulation frequency characteristics of said generator, a source of light for illuminating said cell also traveling with said carrier and spaced from said cell so that its illumination of the cell will be a function of cloud density in the region being traversed by said carrier and means for receiving the signal of said transmitter and for detecting the modulation characteristic thereof, whereby the variations of modulation frequency in the course of the ascent at known rate reflect and thus indicate the altitude and vertical thickness of the clouds met during the ascent.

8. The combination defined in claim 7, further characterized in that said light source and cell are hung below the carrier facing one another with such considerable mutual spacing, of which 10 to 20 feet is representative, that intervening cloud structures of slight density may be detected.

9. The combination defined in claim 7, further characterized in that said light source and cell are hung below said carrier facing one another and rigidly positioned with considerable mutual spacing, and in that said light source is provided with reflector-like means for directing the light toward said cell.

10. A method of determining cloud characteristics which consists in the steps of arranging a light sensitive cell to control as a function of natural light brightness, a signal characteristic of a radio-transmitter, sending said cell and transmitter arrangement upwardly from the earth's surface through a cloud-embracing zone of altitude, receiving and recording the signal characteristic of said transmitter, determining the heights from which the signal is transmitted concurrently with the light intensities indicated by the signal as transmitted therefrom, and determining the heights of commencement and termination of major gradients of light intensity change which reflect and thus indicate cloud height and thickness.

11. A method according to claim 10, characterized by the step of arranging the light sensitive cell to receive light only from below to render the signals functions of the natural light reflected from the earth's surface and from the upper surfaces of cloud structures previously traversed by the cell.

12. A method according to claim 10 characterized by the step of arranging the light sensitive cell to receive light only from above to render the signals functions of the natural zenithal illumination as affected by the presence or absence of clouds.

13. A method according to claim 10, further including the step of arranging a second light sensitive cell to alternate with the first-named cell in controlling, as a function of natural light brightness, the signal characteristic of the radio-transmitter, and the steps of arranging one of said cells to receive light only from below and the other of said cells to receive light only from above, for the purposes described.

14. A method of determining cloud characteristics which consists in the steps of arranging a light sensitive cell to periodically control, as a function of light brightness, a signal characteristic of a radio transmitter; arranging a barometric pressure responsive device to periodically control, as a function of barometric pressure indicative of altitude, a signal characteristic of said radio transmitter; sending said cell, device and transmitter arrangement upwardly from the earth's surface through a cloud embracing zone of altitude; receiving and recording the signal characteristic of said transmitter; coordinating the signal indications of altitude with the light intensity indications of the transmitted signal; and determining the heights of commencement and termination of major gradients of light intensity change which reflect, and thus indicate, cloud height and thickness.

15. The method of determining the height and thickness of clouds consisting in transmitting, from different altitudes, in a zone embracing the clouds, radio signals of a character functionally related to light intensity at said altitudes; coordinating the light intensity indications of said signals with the altitudes of signal transmission; and determining the heights of commencement and termination of major gradients of light intensity change corresponding with the heights, respectively, of the bottoms and tops of clouds within said zone.

16. The method of determining the height and thickness of a continuous cloud layer, which consists in transmitting, from different altitudes, in a zone of altitudes embracing a continuous cloud layer, radio signals of a character functionally related to the intensity of light received from below at said altitudes; coordinating the light intensity indications of said signals with the altitudes of signal transmission; and determining the heights of commencement and termination of a major gradient of light intensity increase as an indication of the ceiling height and thickness of said continuous cloud layer.

17. The method of determining the height and thickness of clouds at night which consists in transmitting, from different altitudes in a zone embracing the clouds, radio signals of a character functionally related to the spacial density of condensed moisture particles at said altitudes; coordinating the said density indications of said signals with the altitudes of signal transmission; and determining the heights of commencement and termination of major gradients of density change corresponding, respectively, to the heights and thicknesses of clouds within said zone.

18. The method of determining the height and thickness of clouds, consisting in transmitting, from different altitudes in a zone embracing the clouds, radio signals of a character functionally related to said altitudes, and radio signals of a character functionally related to light intensity at said altitudes; coordinating the light intensity indications of said signals with the altitude indications thereof; and determining the heights of commencement and termination of major gradients of light intensity change corresponding with the heights, respectively, of the bottoms and tops of clouds within said zone.

19. The method of determining the height and thickness of a continuous cloud layer, which consists in transmitting, from different altitudes in a zone embracing a continuous cloud layer, radio signals of a character functionally related to said altitudes, and radio signals of a character functionally related to intensity of light received from below at said altitudes; coordinating the light intensity indications of said signals with the altitude indications thereof; and determining the heights of commencement and termination of a major gradient of light intensity increase as an indication of the ceiling height and thickness of said continuous cloud layer.

20. The method of determining the height and thickness of clouds at night which consists in transmitting, from different altitudes in a zone embracing the clouds, radio signals of a character functionally related to said altitudes and radio signals of a character functionally related to the spacial density of condensed moisture particles at said altitudes; coordinating the said density indications of said signals with the altitude indications thereof; and determining the height of commencement and termination of major gradients of density change corresponding, respectively, to the heights and thicknesses of clouds within said zone.

FRANCIS W. DUNMORE.